United States Patent
Hirata (10) Patent No.: US 9,914,482 B2
(45) Date of Patent: Mar. 13, 2018

(54) VEHICLE SIDE STRUCTURE

(71) Applicant: SUZUKI MOTOR CORPORATION, Hamamatsu (JP)

(72) Inventor: Takuya Hirata, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 15/027,670

(22) PCT Filed: May 29, 2015

(86) PCT No.: PCT/JP2015/065561
§ 371 (c)(1),
(2) Date: Apr. 6, 2016

(87) PCT Pub. No.: WO2015/186627
PCT Pub. Date: Dec. 10, 2015

(65) Prior Publication Data
US 2017/0073016 A1 Mar. 16, 2017

(30) Foreign Application Priority Data
Jun. 3, 2014 (JP) .................................. 2014-114959

(51) Int. Cl.
*B62D 25/04* (2006.01)
*B62D 25/02* (2006.01)
(Continued)

(52) U.S. Cl.
CPC ........... *B62D 25/04* (2013.01); *B62D 25/025* (2013.01); *B62D 25/081* (2013.01); *B62D 25/14* (2013.01)

(58) Field of Classification Search
CPC ..................................................... B62D 25/04
(Continued)

(56) References Cited

U.S. PATENT DOCUMENTS

| 6,568,746 B2* | 5/2003 | Sakyo | B62D 33/0617 180/89.12 |
| 8,740,290 B2* | 6/2014 | Takayama | B62D 25/02 296/146.6 |
| 9,022,458 B2* | 5/2015 | Hasegawa | B62D 29/043 296/191 |

FOREIGN PATENT DOCUMENTS

| JP | 2009-61991 | 3/2009 |
| JP | 2013-252812 | 12/2013 |

(Continued)

OTHER PUBLICATIONS

International Search Report, PCT/JP2015/065561, Japan Patent Office, dated Jun. 18, 2015, pp. 1-4.

*Primary Examiner* — Dennis H Pedder
(74) *Attorney, Agent, or Firm* — Silicon Valley Patent Group LLP (57) ABSTRACT

The configuration of a vehicle side structure according to the present invention is characterized by including an upper pillar reinforcing member that forms an upper edge of a front door opening of a vehicle, a pillar hinge reinforcing member that forms a front edge of the front door opening, and a side sill strengthening member that forms a lower edge of the front door opening, wherein the pillar hinge reinforcing member has a hinge bulged portion that is bulged toward the vehicle exterior, along a vertical direction, the hinge bulged portion has at least one ridge line that is curved so as to protrude toward the vehicle front side, and the at least one ridge line links a joining point between the pillar hinge reinforcing member and the upper pillar reinforcing member and a joining point between the pillar hinge reinforcing member and the side sill strengthening member.

12 Claims, 4 Drawing Sheets

(51) Int. Cl.
  *B62D 25/08*  (2006.01)
  *B62D 25/14*  (2006.01)
(58) Field of Classification Search
  USPC ............ 296/203.01–203.03, 193.05, 193.06,
                     296/187.09, 187.1; 49/40, 41
  See application file for complete search history.

(56) References Cited

FOREIGN PATENT DOCUMENTS

| | | |
|---|---|---|
| JP | 2014-31130 | 2/2014 |
| WO | 2011118107 | 9/2011 |

* cited by examiner

VEHICLE SIDE STRUCTURE

CROSS-REFERENCE TO RELATED APPLICATION

This application is a national stage application based on and claims the benefit of priority from PCT/JP2015/065561, filed on May 29, 2015, which is based on and claims the benefit of priority from Japanese Patent Application No. 2014-114959, filed on Jun. 3, 2014, the entire contents of both applications are incorporated herein by reference.

FIELD

The present invention relates to a vehicle side structure including an upper pillar reinforcing member that forms an upper edge of a front door opening of a vehicle, a pillar hinge reinforcing member that forms a front edge of the front door opening, and a side sill strengthening member that forms a lower edge of the front door opening.

BACKGROUND

In a side portion on the front side of vehicles, a front edge of a front door opening is constituted by a front pillar. Typically, the front pillar is constituted by an outer panel forming an outer face and an inner panel forming an inner face (e.g., Japanese Patent Laid-open Publication No. 2009-262742). In many cases, each of the outer panel and the inner panel is constituted by a plurality of members that are divided in the vertical direction of the vehicle. For example, according to Japanese Patent Laid-open Publication No. 2009-262742, an inner panel may be constituted by an upper inner panel and a lower inner panel.

SUMMARY OF THE DISCLOSURE

In a collision of a vehicle with a colliding body, a front pillar is subjected to a load from the front side due to the colliding body and a load from the rear side due to the weight of that vehicle. With these loads, the front pillar tends to be deformed at points where members are joined to each other. In order to suppress this deformation, it is necessary to improve the stiffness of the front pillar at points where members are joined to each other. As an example of methods therefor, it is conceivable to add a reinforcing member near the joining point. However, if a reinforcing member is added, the vehicle body weight and the cost increase although the stiffness is improved.

In view of the above-described problems, it is an object of the present invention to provide a vehicle side structure in which deformation of a front pillar at points where members are joined to each other can be suppressed by increasing the stiffness at the joining point without an increase in the vehicle body weight or the cost.

In order to solve the above-described problems, a representative configuration of the present invention is directed to a vehicle side structure including an upper pillar reinforcing member that forms an upper edge of a front door opening of a vehicle, a pillar hinge reinforcing member that extends downward from a lower end of the upper pillar reinforcing member and forms a front edge of the front door opening, and a side sill strengthening member that extends rearward from a lower end of the pillar hinge reinforcing member and forms a lower edge of the front door opening, wherein the pillar hinge reinforcing member includes a hinge bulged portion that is bulged toward the vehicle exterior, along a vertical direction, and wherein the hinge bulged portion has one or more ridge lines that are curved so as to protrude toward the vehicle front side, and the one or more ridge lines link a joining point between the pillar hinge reinforcing member and the upper pillar reinforcing member and a joining point between the pillar hinge reinforcing member and the side sill strengthening member.

With this configuration, the pillar hinge reinforcing member forming the lower portion of an outer face of the front pillar can be provided with an arched ridge line that is curved so as to protrude toward the vehicle front side. Accordingly, loads from the rear side applied to the joining point between the pillar hinge reinforcing member and the upper pillar reinforcing member and the joining point between the pillar hinge reinforcing member and the side sill strengthening member can be effectively transmitted to the vehicle front side. Furthermore, loads from the vehicle front side can be preferably transmitted via the ridge line to the upper pillar reinforcing member and the side sill strengthening member. If the ridge line realizes high load distribution performance of the pillar hinge reinforcing member in this manner, deformation of the joining points can be suppressed by increasing the stiffness at the joining points without an increase in the vehicle body weight or the cost.

Preferably, the upper pillar reinforcing member and the side sill strengthening member respectively have an upper bulged portion and a lower bulged portion that are bulged toward the vehicle exterior, along a longitudinal direction, and the one or more ridge lines of the hinge bulged portion are composed of: an upper ridge line that is continuous with the upper bulged portion and extends to a middle in a height direction of the pillar hinge reinforcing member; a lower ridge line that is continuous with the lower bulged portion and extends to a middle in the height direction of the pillar hinge reinforcing member; and a middle ridge line that is positioned closer to the vehicle front side than each of the upper ridge line and the lower ridge line is, and links the upper ridge line and the lower ridge line. With this configuration, the above-described ridge lines are composed of three ridge lines consisting of an upper ridge line, a lower ridge line, and a middle ridge line. Accordingly, the arc length of each ridge line is made shorter, so that the stiffness at each ridge line can be increased, and, thus, the above-described effects can be increased.

Preferably, the vehicle side structure further includes a cowl side member that is joined to the pillar hinge reinforcing member and extends toward the vehicle front side, the upper ridge line is disposed closer to the rear side than the joining point of the cowl side member is, and a lower end of the upper ridge line is positioned below a middle in the height direction of the joining point of the cowl side member. Accordingly, loads applied from the cowl side member to the pillar hinge reinforcing member can be effectively transmitted via the ridge line to the upper pillar reinforcing member.

Preferably, the pillar hinge reinforcing member further includes a flange that forms the front edge of the front door opening and is oriented to the vehicle rear side, the vehicle side structure further comprises a side body outer panel that is joined to the pillar hinge reinforcing member so as to cover the hinge bulged portion and the flange and forms a vehicle side face, and the pillar hinge reinforcing member and the side body outer panel form a closed cross-section. If the closed cross-section is formed in this manner, the stiffness of the pillar hinge reinforcing member can be increased, and deformation of the pillar hinge reinforcing member can be more effectively prevented.

Preferably, the one or more ridge lines are on the vehicle rear side of the hinge bulged portion, and the pillar hinge reinforcing member further includes hinge attachment portions that are arranged closer to the vehicle front side than the upper ridge line and the lower ridge line are, on a top panel of the hinge bulged portion, and to which door hinges of a front door are attachable. Since the hinge attachment portions to which door hinges of a front door are attachable have high stiffness, if the upper ridge line and the lower ridge line are arranged near the hinge attachment portions, the stiffness at the upper ridge line and the lower ridge line can be increased. Accordingly, loads applied to the pillar hinge reinforcing member can be more reliably transmitted via the upper ridge line and the lower ridge line to the upper pillar reinforcing member, the side sill strengthening member, and the cowl side member, and the above-described effects can be increased.

Preferably, the pillar hinge reinforcing member further includes hinge attachment portions that are arranged on a top panel of the hinge bulged portion, and to which door hinges of a front door are attachable, and the closed cross-section is disposed closer to the vehicle rear side than each of the hinge attachment portions is. Accordingly, the stiffness near the hinge attachment portions can be increased, and, thus, the stiffness of the entire pillar hinge reinforcing member provided with the hinge attachment portions can be increased.

Preferably, the pillar hinge reinforcing member further includes a hinge attachment portion that is disposed on a top panel of the hinge bulged portion, and to which a door hinge of a front door is attachable, the hinge attachment portion is disposed between the upper ridge line and the joining point of the cowl side member, and the hinge attachment portion, the upper ridge line, and the joining point of the cowl side member are positioned on the same straight line when viewed from the side of the vehicle. Accordingly, loads from the cowl side member can be effectively transmitted via the hinge attachment portion to the upper ridge line and then to the upper pillar reinforcing member, and the stiffness between the cowl side member and the upper pillar reinforcing member can be increased.

Preferably, the vehicle side structure further includes a dash side panel that extends toward the vehicle front side from an end portion in a vehicle width direction of a dash panel that separates an engine room and the vehicle interior, the cowl side member overlaps the dash side panel from the vehicle exterior side and is joined thereto, the pillar hinge reinforcing member further includes a hinge attachment portion that is disposed on a top panel of the hinge bulged portion, and to which a door hinge of a front door is attachable, the hinge attachment portion is disposed on an extension line of a lower edge of the dash side panel when viewed from the side of the vehicle, and the extension line of the lower edge of the dash side panel passes through the hinge attachment portion and then intersects the lower ridge line. Accordingly, loads from the cowl side member can be effectively transmitted via the hinge attachment portion to the lower ridge line and then to the side sill strengthening member, and the stiffness between the cowl side member and the side sill strengthening member can be increased.

Preferably, the vehicle side structure further includes a dash side panel that extends toward the vehicle front side from an end portion in a vehicle width direction of a dash panel that separates an engine room and the vehicle interior, the cowl side member overlaps the dash side panel from the vehicle exterior side and is joined thereto, the one or more ridge lines are on the vehicle rear side of the hinge bulged portion, the pillar hinge reinforcing member further includes hinge attachment portions that are arranged closer to the vehicle front side than the upper ridge line and the lower ridge line are, on a top panel of the hinge bulged portion, and to which door hinges of a front door are attachable, the hinge attachment portion on the upper side is disposed on an extension line in the longitudinal direction of the cowl side member when viewed from the side of the vehicle, the hinge attachment portion on the lower side is disposed on an extension line of a lower edge of the dash side panel when viewed from the side of the vehicle, and a region defined by the extension line extending in the longitudinal direction of the cowl side member, the extension line of the lower edge of the dash side panel, and the one or more ridge lines of the hinge bulged portion is substantially triangular when viewed from the side of the vehicle.

Accordingly, the pillar hinge reinforcing member, the cowl side member, and the dash side panel form a triangular frame structure. Since a triangular frame structure is excellent in the distribution performance of loads from various directions, it is possible to realize a structure with further increased stiffness that suppresses deformation in a collision.

The present invention can provide a vehicle side structure in which deformation of a front pillar at points where members are joined to each other can be suppressed by increasing the stiffness at the joining point without an increase in the vehicle body weight or the cost.

DETAILED DESCRIPTION

Referring to the accompanying drawings, the following is a detailed explanation of a preferred embodiment of the present invention. All dimensions, materials and further specific numbers shown in the embodiment are given only by way of example, in order to aid the understanding of the invention, but are not meant to limit the present invention, unless this is explicitly stated so. It should be further noted that throughout this specification and in the drawings, elements that have substantially the same functionality and/or structure are denoted by the same reference numerals, and their duplicate explanation has been omitted. Furthermore, elements that are not directly related to the present invention may not necessarily be shown in the figures.

Figure 1A:
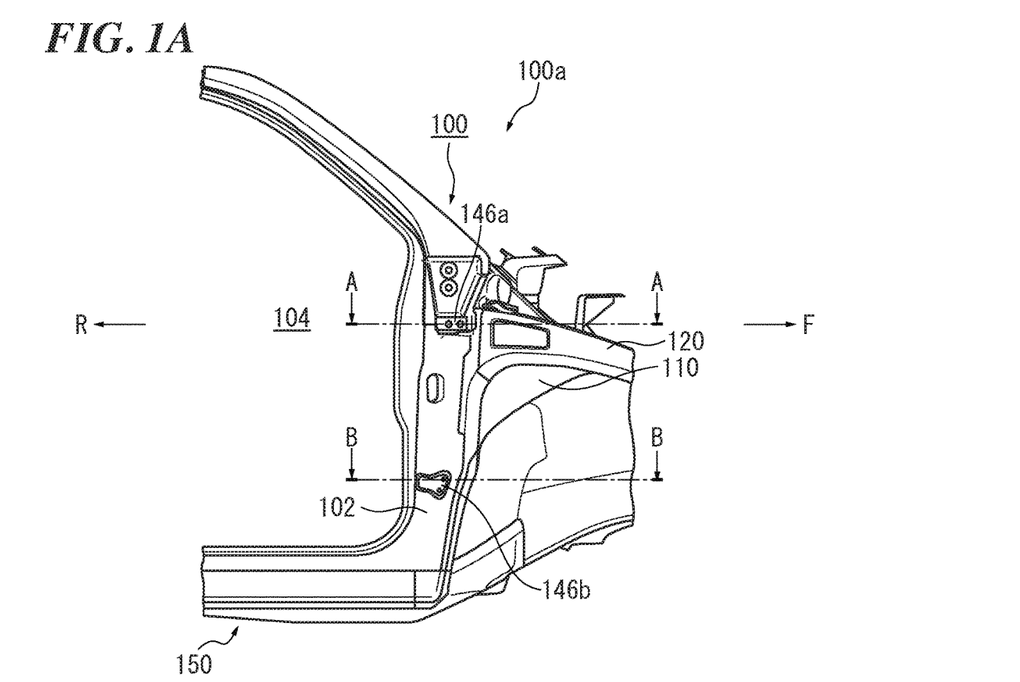
FIGS. 1A and 1B show side views of a vehicle including a vehicle side structure according to this embodiment.
Figure 1B:
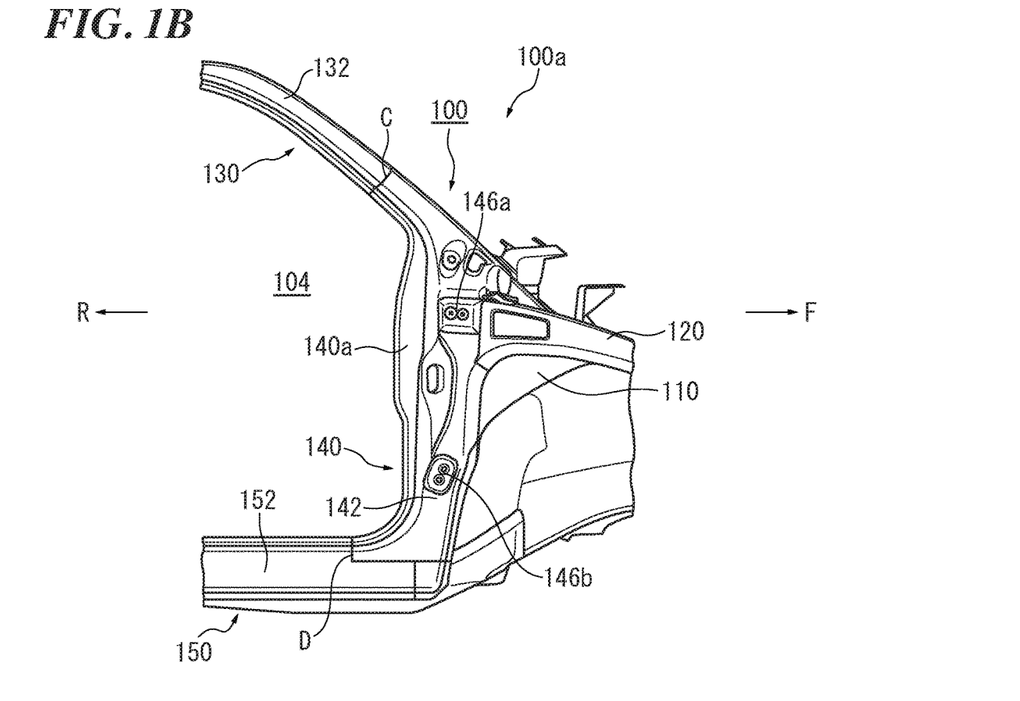

FIGS. 1A and 1B show side views of a vehicle 100a including a vehicle side structure 100 according to this embodiment. FIGS. 1A and 1B show views of states of the right side of the vehicle 100a when viewed from the outside of the vehicle, where FIG. 1A shows a state in which a side body outer panel 102 forming a vehicle side face is present, and FIG. 1B shows a state in which the side body outer panel 102 has been removed.

As shown in FIG. 1A, in the vehicle 100a, a vehicle side face is constituted by the side body outer panel 102. As shown in FIG. 1B, the vehicle side structure 100 of this embodiment includes an upper pillar reinforcing member 130, a pillar hinge reinforcing member 140, and a side sill strengthening member 150 each of which is disposed closer to the vehicle interior than the side body outer panel 102 is.

The upper pillar reinforcing member 130 forms an upper edge of a front door opening 104 of the vehicle 100a. The pillar hinge reinforcing member 140 extends downward from a lower end of the upper pillar reinforcing member 130, and forms a front edge of the front door opening 104. The side sill strengthening member 150 extends rearward from a lower end of the pillar hinge reinforcing member 140, and forms a lower edge of the front door opening 104.

As shown in FIG. 1B, each of the upper pillar reinforcing member 130, the pillar hinge reinforcing member 140, and the side sill strengthening member 150 has a bulged portion. Specifically, the pillar hinge reinforcing member 140 has a hinge bulged portion 142 that is bulged toward the vehicle exterior, along the vertical direction. The upper pillar reinforcing member 130 and the side sill strengthening member 150 respectively have an upper bulged portion 132 and a lower bulged portion 152 that are bulged toward the vehicle exterior, along the longitudinal direction.

As shown in FIG. 1B, the vehicle side structure 100 of this embodiment is configured further including a dash side panel 110 and a cowl side member 120. The dash side panel 110 is disposed so as to extend toward the vehicle front side from an end portion in the vehicle width direction of a dash panel (not shown) that separates an engine room and the vehicle interior. The cowl side member 120 overlaps the dash side panel 110 from the vehicle exterior side and is joined thereto, has a rear end joined to the pillar hinge reinforcing member 140, and is disposed so as to extend toward the vehicle front side.

Figure 2A:
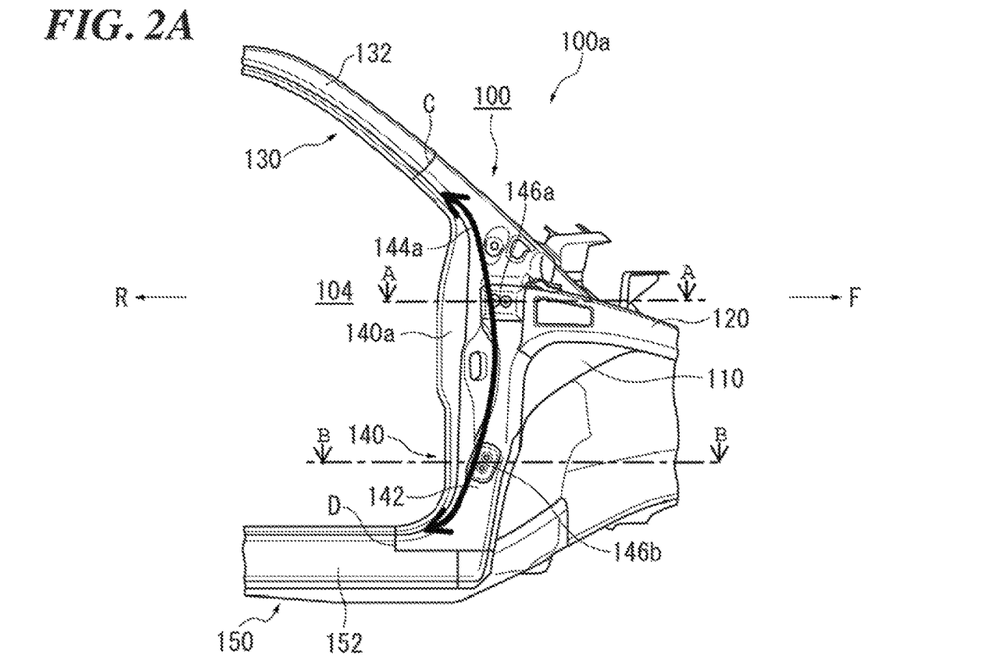
FIGS. 2A and 2B show views of ridge lines provided on a pillar hinge reinforcing member of the vehicle side structure in FIG. 1B.
Figure 2B:
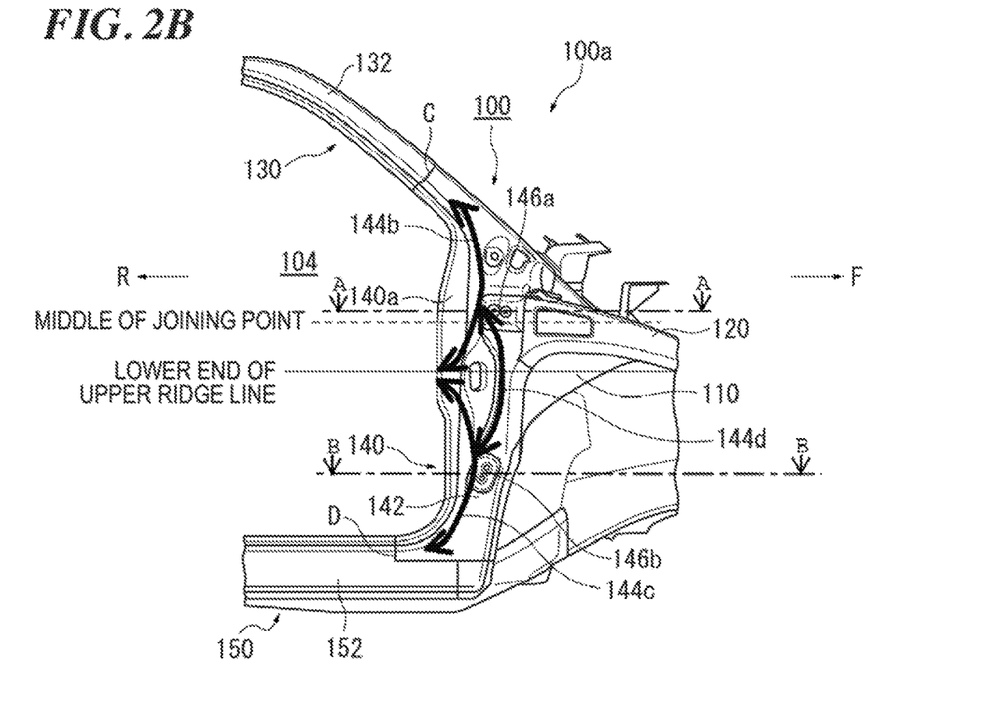

FIGS. 2A and 2B shows views of ridge lines provided on the pillar hinge reinforcing member 140 of the vehicle side structure 100 in FIG. 1B. The vehicle side structure 100 of this embodiment is characterized in that, as shown in FIG. 2A, the hinge bulged portion 142 of the pillar hinge reinforcing member 140 has a ridge line 144a curved so as to protrude toward the vehicle front side. In the pillar hinge reinforcing member 140, the ridge line 144a links a joining point (hereinafter, referred to as a joining point C) between the pillar hinge reinforcing member 140 and the upper pillar reinforcing member 130 and a joining point (hereinafter, referred to as a joining point D) between the pillar hinge reinforcing member 140 and the side sill strengthening member 150.

As described above, in the pillar hinge reinforcing member 140, the joining point C at the upper pillar reinforcing member 130 and the joining point D at the side sill strengthening member 150 are linked by the arched ridge line 144a. Thus, in a collision, loads from the rear side applied from the joining points C and D can be effectively transmitted to the vehicle front side, that is, toward the cowl side member 120. Furthermore, loads from the vehicle front side applied from the cowl side member 120 can be transmitted via the ridge line 144a to the upper pillar reinforcing member 130 and the side sill strengthening member 150. Accordingly, the ridge line 144a can improve the load distribution performance of the pillar hinge reinforcing member 140. Thus, it is possible to improve the stiffness at the joining points, thereby suppressing deformation thereof, without an increase in the vehicle body weight or the cost.

Although this embodiment has described, as an example, a configuration in which a ridge line on the vehicle rear side of the hinge bulged portion 142 of the pillar hinge reinforcing member 140 is curved so as to protrude toward the vehicle front side, there is no limitation to this, and a ridge line on the vehicle front side may be curved so as to protrude toward the vehicle front side. In this case, if a ridge line on the vehicle rear side is curved so as to protrude toward the vehicle front side as in this embodiment, the ridge line 144a is preferably disposed so as not to be in contact with the ridge line on the vehicle front side. If the ridge lines are in contact with each other, the upper portion and the lower portion of the hinge bulged portion 142 are divided, and loads are concentrated on this division point from which folding may start. Furthermore, although this embodiment has described a configuration in which the joining points C and D respectively with the upper pillar reinforcing member 130 and the side sill strengthening member 150 are linked by the ridge line 144a, not only cases in which the ridge line 144a actually reaches these joining points but also cases in which the ridge line 144a merely reaches points near the joining points C and D are encompassed in the scope of the present invention.

FIG. 2B is a more detailed view of the ridge line shown in FIG. 2A. In this embodiment, the ridge line 144a of the hinge bulged portion 142 shown in FIG. 2A includes an upper ridge line 144b, a lower ridge line 144c, and a middle ridge line 144d shown in FIG. 2B. The upper ridge line 144b is a ridge line that is continuous with the upper bulged portion 132 and extends to the middle in the height direction of the pillar hinge reinforcing member 140 while curving toward the vehicle front side. The lower ridge line 144c is a ridge line that is continuous with the lower bulged portion 152 and extends to the middle in the height direction of the pillar hinge reinforcing member 140 while curving toward the vehicle front side. The middle ridge line 144d is a ridge line that is positioned closer to the vehicle front side than each of the upper ridge line 144b and the lower ridge line 144c is, and links the upper ridge line 144b and the lower ridge line 144c while curving toward the vehicle front side.

That is to say, in this embodiment, the ridge line 144a curved so as to protrude toward the vehicle front side is configured such that the middle ridge line 144d, the portion of the upper ridge line 144b above the point continuous with the middle ridge line 144d, and the portion of the lower ridge line 144c below the point continuous with the middle ridge line 144d are continuous with one another. If the ridge line 144a curved so as to protrude toward the vehicle front side is constituted by a plurality of ridge lines (the upper ridge line 144b, the lower ridge line 144c, and the middle ridge line 144d) in this manner, the arc length of each ridge line can be made shorter, and the stiffness at each ridge line can be increased. Accordingly, the stiffness of the entire pillar hinge reinforcing member 140 and the above-described effects can be further increased.

Furthermore, in this embodiment, as shown in FIG. 2B, the upper ridge line 144b described above is disposed closer to the rear side than the joining point of the cowl side member 120 is, and a lower end of the upper ridge line 144b is positioned below the middle in the height direction of the joining point of the cowl side member 120. Accordingly, loads applied from the cowl side member 120 to the pillar hinge reinforcing member 140 can be effectively transmitted via the upper ridge line 144b to the upper pillar reinforcing member 130.

Figure 3A:
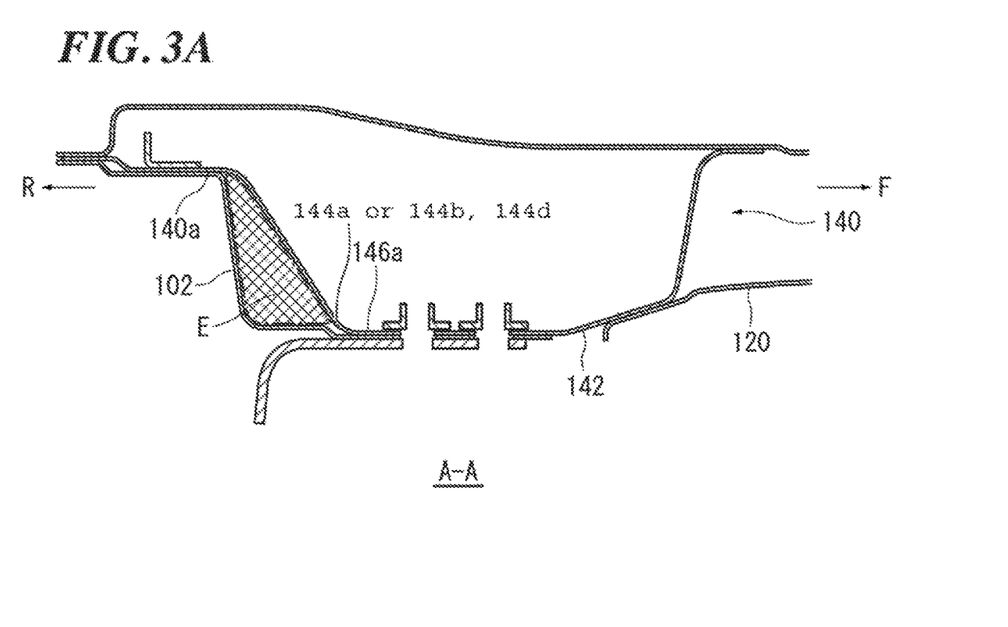
FIGS. 3A and 3B show cross-sectional views of FIG. 1A.
Figure 3B:
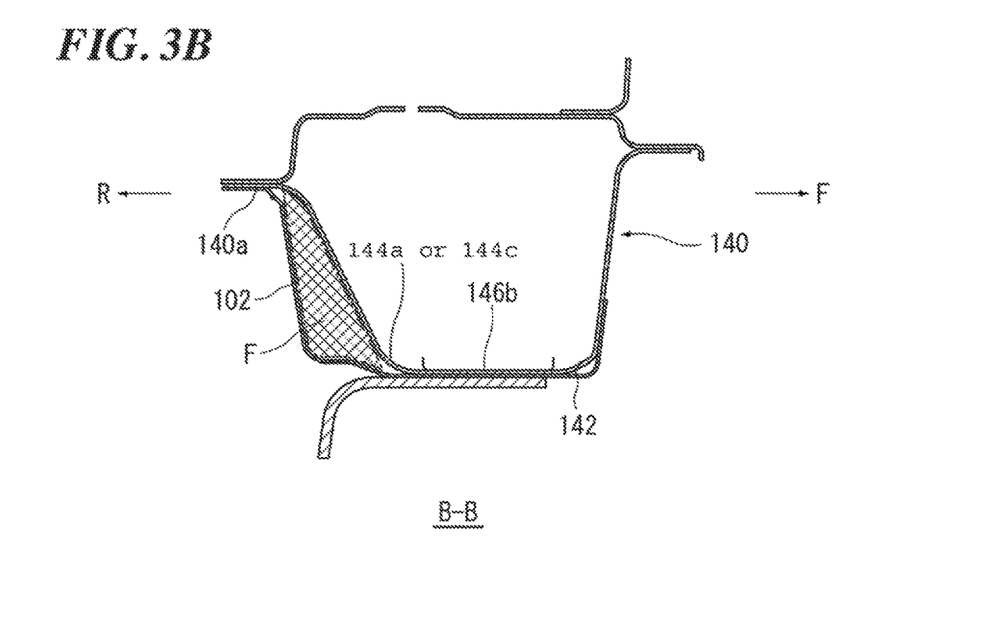

FIGS. 3A and 3B show cross-sectional views of FIG. 1A, where FIG. 3A shows a cross-sectional view taken along the line A-A in FIG. 1A, and FIG. 3B shows a cross-sectional view taken along the line B-B in FIG. 1A. As shown in FIGS. 2A and 2B, in this embodiment, the pillar hinge reinforcing member 140 has a flange 140a forming the front edge of the front door opening 104 and oriented to the vehicle rear side. In this embodiment, as shown in FIGS. 1A and 1B, the side body outer panel 102 forming the vehicle side face is joined to the pillar hinge reinforcing member 140 so as to cover the hinge bulged portion 142 and the flange 140a (see FIGS. 2A and 2B).

If the side body outer panel 102 is joined in this manner, as shown in FIGS. 3A and 3B, the pillar hinge reinforcing member 140 and the side body outer panel 102 form substantially triangular closed cross-sections E and F (indicated with hatching) in horizontal cross-sections of the vehicle 100a. Accordingly, the stiffness of the pillar hinge reinforcing member 140 can be increased, and deformation due to loads in a collision can be more effectively suppressed.

As shown in FIG. 2B, in the pillar hinge reinforcing member 140, a top panel of the hinge bulged portion 142 has an upper hinge attachment portion 146a (a hinge attachment portion on the upper side) and a lower hinge attachment portion 146b (a hinge attachment portion on the lower side) as hinge attachment portions to which door hinges (not shown) of the front door are attachable (hereinafter, they are collectively referred to simply as hinge attachment portions). In this embodiment, these hinge attachment portions are arranged such that the upper hinge attachment portion 146a is closer to the vehicle front side than the upper ridge line 144b is and the lower hinge attachment portion 146b is closer to the vehicle front side than the lower ridge line 144c is.

The hinge attachment portions to which the door hinges of the front door are attachable have high stiffness. Thus, if the upper ridge line 144b and the lower ridge line 144c are arranged near the hinge attachment portions, high stiffness can be obtained at the ridge lines. Accordingly, loads can be more reliably transmitted via the ridge lines, and the above-described effects can be increased.

Furthermore, as shown in FIGS. 3A and 3B, the closed cross-sections E and F described above are arranged closer to the vehicle rear side respectively than the upper hinge attachment portion 146a and the lower hinge attachment portion 146b are. Accordingly, with the closed cross-sections E and F, higher stiffness can be obtained near the hinge attachment portions. Thus, the stiffness at the upper ridge line 144b and the lower ridge line 144c can be further increased, and the load transmission performance can be improved.

Figure 4:
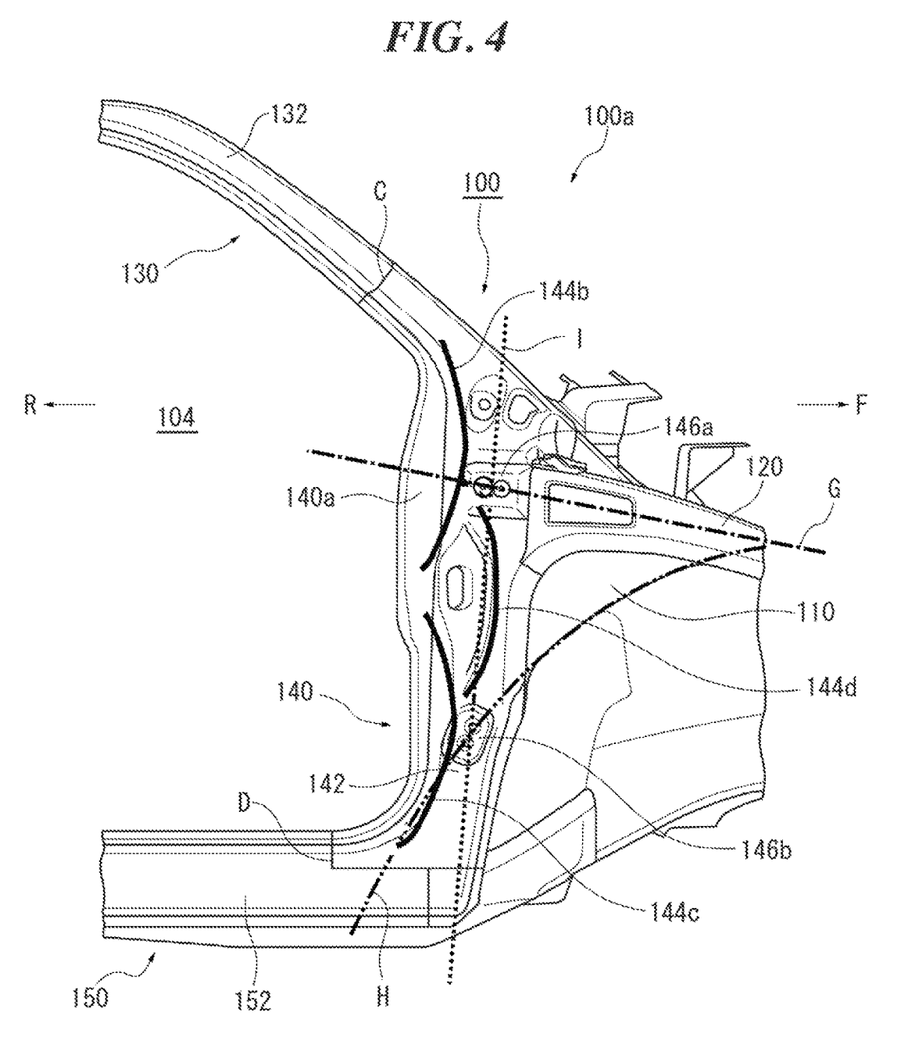
FIG. 4 is a view showing a positional relationship between a cowl side member and a dash side panel, and hinge attachment portions in FIG. 2B.

FIG. 4 is a view showing a positional relationship between the cowl side member 120 and the dash side panel 110, and the hinge attachment portions in FIG. 2B. As shown in FIG. 4, in this embodiment, the upper hinge attachment portion 146a is disposed between the upper ridge line 144b and the joining point of the cowl side member 120 when viewed from the side of the vehicle, and the upper hinge attachment portion 146a, the upper ridge line 144b, and the joining point of the cowl side member 120 are positioned on the same straight line (on an extension line in the longitudinal direction of the cowl side member 120) when viewed from the side of the vehicle (hereinafter, this straight line is referred to as a straight line G).

If the upper hinge attachment portion 146a, the upper ridge line 144b, and the joining point of the cowl side member 120 are arranged on the straight line G in this manner, loads from the cowl side member 120 can be effectively transmitted via the upper hinge attachment portion 146a to the upper ridge line 144b and then to the upper pillar reinforcing member 130. Accordingly, the stiffness between the cowl side member 120 and the upper pillar reinforcing member 130 can be increased.

Furthermore, in this embodiment, as shown in FIG. 4, the lower hinge attachment portion 146b is disposed on an extension line of a lower edge of the dash side panel 110 when viewed from the side of the vehicle, and the extension line of the lower edge of the dash side panel 110 passes through the lower hinge attachment portion 146b and then intersects the lower ridge line 144c when viewed from the side of the vehicle (hereinafter, this extension line is referred to as an extension line H). Accordingly, loads from the cowl side member 120 can be effectively transmitted via the lower hinge attachment portion 146b to the lower ridge line 144c and then to the side sill strengthening member 150. Accordingly, the stiffness between the cowl side member 120 and the side sill strengthening member 150 can be increased.

Furthermore, in this embodiment, as shown in FIG. 4, a region defined by the extension line (the straight line G) extending in the longitudinal direction of the cowl side member 120, the extension line H of the lower edge of the dash side panel 110, and the ridge line 144a of the hinge bulged portion 142 (see FIG. 2A), that is, the ridge line 144a constituted by the upper ridge line 144b, the lower ridge line 144c, and the middle ridge line 144d is substantially triangular when viewed from the side of the vehicle. Accordingly, the pillar hinge reinforcing member, the cowl side member, and the dash side panel form a triangular frame structure. Since a triangular frame structure is excellent in the distribution performance of loads from various directions, the above-described configuration can realize a structure with further increased stiffness that suppresses deformation in a collision. The same effects can be obtained also with a substantially triangular region defined by the straight line G, the extension line H, and a straight line I linking the upper hinge attachment portion 146a and the lower hinge attachment portion 146b, as shown in FIG. 4.

While a preferred embodiment of the present invention has been described above with reference to the accompanying drawings, it should be appreciated that the present invention is not limited to the embodiment shown above. It will be apparent for a person skilled in the art that various modifications and variations may be made within the scope of the invention as defined in the appended claims, and those modifications and variations should be understood to be included within the technical scope of the present invention.

The present invention can be applied to vehicle side structures including an upper pillar reinforcing member that forms an upper edge of a front door opening of a vehicle, a pillar hinge reinforcing member that forms a front edge of the front door opening, and a side sill strengthening member that forms a lower edge of the front door opening.

The invention claimed is:

1. A vehicle side structure comprising:
an upper pillar reinforcing member that forms an upper edge of a front door opening of a vehicle;
a pillar hinge reinforcing member that extends downward from a lower end of the upper pillar reinforcing member and forms a front edge of the from door opening; and
a side sill strengthening member that extends rearward from a lower end of the pillar hinge reinforcing member and forms a lower edge of the front door opening;
wherein the pillar hinge reinforcing member includes a hinge bulged portion that is bulged toward the vehicle exterior, along a vertical direction;
wherein the upper pillar reinforcing member and the side sill strengthening member respectively have an upper bulged portion and a lower bulged portion that are bulged toward the vehicle exterior, along a longitudinal direction;

wherein the hinge bulged portion is composed of:
    an upper ridge line that is continuous with the upper bulged portion and extends to a middle in a height direction of the pillar hinge reinforcing member;
    a lower ridge line that is continuous with the lower bulged portion and extends to a middle in the height direction of the pillar hinge reinforcing member; and
    a middle ridge line that: (a) is positioned closer to the vehicle from side than each of the upper ridge line and the lower ridge line; and (b) links the upper ridge line and the lower ridge line;

wherein a lower end of the upper ridge line is placed lower than an upper end of the middle ridge line, and a lower end of the middle ridge line is placed lower than an upper end of the lower ridge line; and wherein the upper ridge line intersects a joining point between the pillar hinge reinforcing member and the upper pillar reinforcing member, and the lower ridge line intersects a joining point between the pillar hinge reinforcing member and the side sill strengthening member.

2. The vehicle side structure according to claim 1, further comprising a cowl side member that is joined to the pillar hinge reinforcing member and extends toward the vehicle front side, wherein:
    the upper ridge line is disposed closer to the rear side than the joining point of the cowl side member is; and
    the lower end of the upper ridge line is positioned below a middle in the height direction of the joining point of the cowl side member.

3. The vehicle side structure according to claim 1, wherein:
    the pillar hinge reinforcing member further includes a flange that forms the front edge of the front door opening and is oriented to the vehicle rear side;
    the vehicle side structure further comprises a side body outer panel that is joined to the pillar hinge reinforcing member so as to cover the hinge bulged portion and the flange and forms a vehicle side face; and
    the pillar hinge reinforcing member and the side body outer panel form a closed cross-section.

4. The vehicle side structure according to claim 2, wherein:
    the pillar hinge reinforcing member further includes a flange that forms the front edge of the front door opening and is oriented to the vehicle rear side;
    the vehicle side structure further comprises a side body outer panel that is joined to the pillar hinge reinforcing member so as to cover the hinge bulged portion and the flange and forms a vehicle side face; and
    the pillar hinge reinforcing member and the side body outer panel form a closed cross-section.

5. The vehicle side structure according to claim 1, wherein:
    the upper ridge line, the lower ridge line, and the middle ridge line are on the vehicle rear side of the hinge bulged portion; and
    the pillar hinge reinforcing member further includes hinge attachment portions that are arranged closer to the vehicle front side than the upper ridge line and the lower ridge line are, on a top panel of the hinge bulged portion, and to which door hinges of a front door are attachable.

6. The vehicle side structure according to claim 2, wherein:
    the upper ridge line, the lower ridge line, and the middle ridge line are on the vehicle rear side of the hinge bulged portion; and
    the pillar hinge reinforcing member further includes hinge attachment portions that are arranged closer to the vehicle front side than the upper ridge line and the lower ridge line are, on a top panel of the hinge bulged portion, and to which door hinges of a front door are attachable.

7. A vehicle side structure comprising:
    an upper pillar reinforcing member that forms an upper edge of a front door opening of a vehicle;
    a pillar hinge reinforcing member that extends downward from a lower end of the upper pillar reinforcing member and forms a front edge of the front door opening; and
    a side sill strengthening member that extends rearward from a lower end of the pillar hinge reinforcing member and forms a lower edge of the front door opening;

wherein the pillar hinge reinforcing member includes a hinge bulged portion that is bulged toward the vehicle exterior, along a vertical direction;

wherein the hinge bulged portion has one continuous ridge line that is curved so as to arch convexly toward the vehicle front side, and the one ridge line intersects a joining point between the pillar hinge reinforcing member and the upper pillar reinforcing member and a joining point between the pillar hinge reinforcing member and the side sill strengthening member;

wherein the pillar hinge reinforcing member further includes a flange that forms the front edge of the front door opening and is oriented to the vehicle rear side;

wherein the vehicle side structure further comprises a side body outer panel that is joined to the pillar hinge reinforcing member so as to cover the hinge bulged portion and the flange and forms a vehicle side face;

wherein the pillar hinge reinforcing member and the side body outer panel form a closed cross section;

wherein the pillar hinge reinforcing member further includes hinge attachment portions that are arranged on a top panel of the hinge bulged portion, and to which door hinges of a front door are attachable; and wherein the closed cross-section is disposed closer to the vehicle rear side than each of the hinge attachment portions.

8. The vehicle side structure according to claim 3, wherein:
    the pillar hinge reinforcing member further includes hinge attachment portions that are arranged on a top panel of the hinge bulged portion, and to which door hinges of a front door are attachable; and
    the closed cross-section is disposed closer to the vehicle rear side than each of the hinge attachment portions.

9. The vehicle side structure according to claim 4, wherein:
    the pillar hinge reinforcing member further includes hinge attachment portions that are arranged on a top panel of the hinge bulged portion, and to which door hinges of a front door are attachable; and
    the closed cross-section is disposed closer to the vehicle rear side than each of the hinge attachment portions.

10. The vehicle side structure according to claim 2, wherein:
    the pillar hinge reinforcing member further includes a hinge attachment portion that is disposed on a top panel of the hinge bulged portion, and to which a door hinge of a front door is attachable;

the hinge attachment portion is disposed between the upper ridge line and the joining point of the cowl side member; and the hinge attachment portion, the upper ridge line, and the joining point of the cowl side member are positioned on a straight line when viewed from the side of the vehicle.

11. The vehicle side structure according to claim 2, further comprising a dash side panel that extends toward the vehicle front side from an end portion in a vehicle width direction of a dash panel that separates an engine room and the vehicle interior, wherein:

the cowl side member overlaps the dash side panel from the vehicle exterior side and is joined thereto;

the pillar hinge reinforcing member further includes a hinge attachment portion that is disposed on a top panel of the hinge bulged portion, and to which a door hinge of a front door is attachable;

the hinge attachment portion is disposed on an extension line of a lower edge of the dash side panel when viewed from the side of the vehicle; and the extension line of the lower edge of the dash side panel passes through the hinge attachment portion and then intersects the lower ridge line.

12. The vehicle side structure according to claim 2, further comprising a dash side panel that extends toward the vehicle front side from an end portion in a vehicle width direction of a dash panel that separates an engine room and the vehicle interior, wherein:

the cowl side member overlaps the dash side panel from the vehicle exterior side and is joined thereto;

the upper ridge line, the lower ridge line, and the middle ridge line are on the vehicle rear side of the hinge bulged portion;

the pillar hinge reinforcing member further includes hinge attachment portions that are arranged closer to the vehicle front side than the upper ridge line and the lower ridge line are, on a top panel of the hinge bulged portion, and to which door hinges of a front door are attachable, wherein the hinge attachment portions includes a hinge attachment portion on the upper side and a hinge attachment portion on the lower side;

the binge attachment portion on the upper side is disposed on an extension line in the longitudinal direction of the cowl side member when viewed from the side of the vehicle;

the hinge attachment portion on the lower side is disposed on an extension line of a lower edge of the dash side panel when viewed from the side of the vehicle; and a region defined by the extension line extending in the longitudinal direction of the cowl side member, the extension line of the lower edge of the dash side panel, and the upper ridge line, the lower ridge line, and the middle ridge line of the hinge bulged portion is substantially triangular when viewed from the side of the vehicle.

* * * * *